United States Patent [19]

Kamitake

[11] Patent Number: 4,751,732
[45] Date of Patent: Jun. 14, 1988

[54] BROADCASTING SYSTEM

[75] Inventor: Takashi Kamitake, Tokyo, Japan

[73] Assignee: Kabushiki Kaisha Toshiba, Kawasaki, Japan

[21] Appl. No.: 748,343

[22] Filed: Jun. 24, 1985

[30] Foreign Application Priority Data

Jul. 6, 1984 [JP] Japan .................. 59-139111
Jul. 6, 1984 [JP] Japan .................. 59-139112

[51] Int. Cl.$^4$ .................. H04N 7/167; H04N 7/00
[52] U.S. Cl. .................. 380/20; 358/84; 380/14; 455/2; 455/12
[58] Field of Search .................. 358/84, 115, 119, 122; 455/2, 12; 380/20, 14

[56] References Cited

U.S. PATENT DOCUMENTS

| | | | |
|---|---|---|---|
| 3,508,005 | 4/1970 | Hamburger | 455/2 |
| 3,716,654 | 2/1973 | Hendrickson et al. | |
| 4,025,851 | 5/1977 | Haselwood et al. | 455/2 |
| 4,317,215 | 2/1982 | Tabata et al. | 455/2 |
| 4,323,921 | 4/1982 | Guillou | |
| 4,484,027 | 11/1984 | Lee et al. | 358/122 |
| 4,484,217 | 11/1984 | Block et al. | 358/122 |
| 4,503,462 | 3/1985 | Kelly et al. | 358/122 |
| 4,528,588 | 7/1985 | Lofberg | 358/122 |
| 4,533,949 | 8/1985 | Fujimura et al. | 358/122 |
| 4,577,224 | 3/1986 | Ost | 358/122 |
| 4,599,647 | 7/1986 | George et al. | 380/20 |
| 4,712,238 | 12/1987 | Gilhousen et al. | 380/20 |

FOREIGN PATENT DOCUMENTS 2079109 1/1982 United Kingdom .

OTHER PUBLICATIONS

"The Memory Card its Possible Use to Pay TV Satellite Broadcasting", Q. A. Hoang (CII Honeywell Bull) May 31, 1983, pp. 1-10.

Primary Examiner—Stephen C. Buczinski
Attorney, Agent, or Firm—Foley & Lardner, Schwartz, Jeffery, Schwaab, Mack, Blumenthal & Evans

[57] ABSTRACT

Broadcasting stations send programs to subscribers via satellite scrambled signals. A subscriber inserts an IC card into a meter rate charging decoder to view/listen chargeable programs. Program codes are written in the IC card to determine fees to be paid to each station.

10 Claims, 11 Drawing Sheets

| START CODE | LENGTH OF MASSAGE | ADDRESS | DATA 1 2 ..... n | CHECK SUM |

FIG. 8

| START CODE | LENGTH OF MASSAGE | DATA 1 2 ..... n | CHECK SUM |

FIG. 9

STATION CODE

| STATION CH | PROGRAM | RANDOM NUMBER DATA |

ORIGINAL DATA TO BE SENT

BROADCASTING SYSTEM

BACKGROUND OF THE INVENTION

1. Field of the Invention

The present invention relates to chargeable broadcasting system, more particularly to a chargeable broadcasting system adapted for a meter rate charging.

2. Description of the Prior Art

As a form of television broadcast there is a chargeable broadcasting system. This is a system in which a viewer/listener purchases only those programs that he desires. That is, he views/listens to only those programs which he desires to view/listen to by paying for them.

In such a chargeable broadcasting system, it is necessary that the broadcasting station is addressable to individual viewer/listener for the purpose of fee management.

In this sense, the conventional method of distributing the radio waves uniformly to all the viewers/listeners is not suited for the chargeable broadcasting system. In contrast with this, in the system of connecting the broadcasting station with individual viewer/listener with wires, the broadcasting station can address individual viewer/listener so that it is possible to identify and collect the information on the individual viewer/listener, and such a system is actually being tried.

However, this systems requires one to connect the broadcasting station with the contracting viewers/listeners using wires so that it is not suited for the case when the viewers/listeners are scattered over a wide geographical region. Therefore, it is desirable in realizing the above chargeable broadcasting system to utilize radio waves, rather than wires, in the same way as is currently done, for the reason of flexibility of the system. However, it has never been employed as an actual chargeable broadcasting system due to the reason that it is not possible to achieve an effective collection of data pertaining to viewing/listening.

SUMMARY OF THE INVENTION

An object of the present invention is to provide a broadcasting system adapted for accurately managing for each individual receiver the received amount of the broadcast signals in the wireless broadcasting.

Another object of the present invention is to provide a broadcasting system which makes it possible to realize an impartial chargeable broadcasting in wireless broadcasting.

Another object of the present invention is to provide a broadcasting system which makes it possible to accomplish an efficient collection of data concerning the viewing/listening in wireless broadcasting.

Another object of the present invention is to provide a broadcasting system which can positively prevent an illicit use by means of an IC card.

Briefly described, these and other objects of the present invention are accomplished by the provision of an improved broadcasting system which includes a broadcasting station which transmits broadcast signals appended by a station data that identifies the broadcasting station, a receiving apparatus which receives the broadcast signals and separates the station data from the broadcast signals, an IC card which is bought by each subscriber to the meter rate charging system, to memorize the station data that is separated by the receiving apparatus, and a management center which collects the memory content of the IC card and manages the reception data of the subscriber.

BRIEF DESCRIPTION OF DRAWING

These and other objects, features and advantages of the present invention will be more apparent from the following description of a preferred embodiment, taken in conjunction with the accompanying drawings, in which:

FIGS. 4a & b are a diagrams illustrating the line rotation which represents a scrambling for the video signal shown in FIG. 3;

DESCRIPTION OF THE PREFERRED EMBODIMENTS

Figure 1:
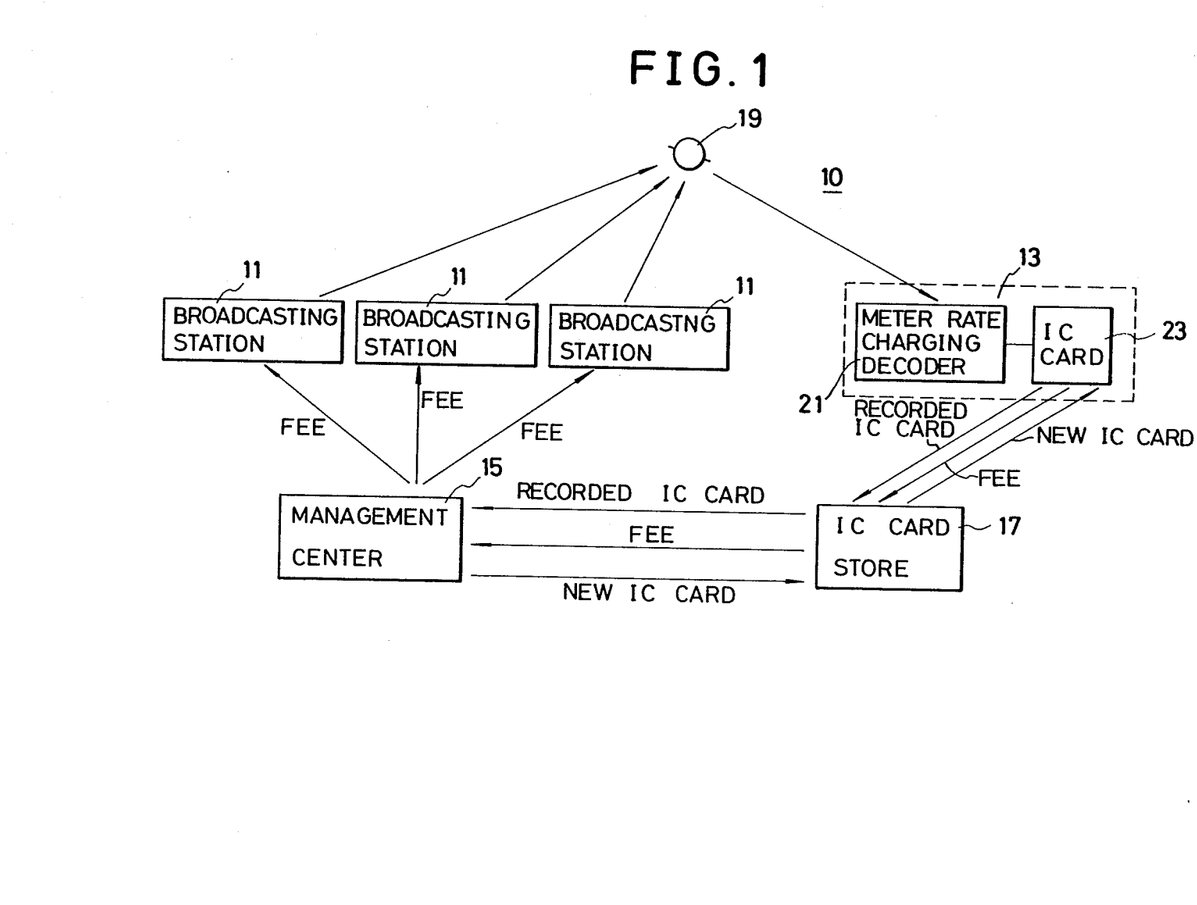
FIG. 1 is an overall block diagram for a chargeable broadcasting system embodying the present invention.

Referring to FIG. 1, there is shown a broadcasting system embodying the present invention with reference numeral 10. The broadcast system 10 is for accomplishing a wireless chargeable broadcasting between a plurality of broadcasting stations 11 and a plurality of subscribers 13. Employed in this embodiment is the satellite broadcasting system.

The broadcasting system 10 includes, in addition to the broadcasting stations 11 and the subscribers 13, a management center 15 and one or a plurality of IC card stores 17. The IC card is a plastic sheet of the credit card size in which are buried a CPU and a memory, in order to endow it with memory function and a processing function. An IC card of this kind has already been developed by a plurality of makers.

A signal (it may be either analog or digital) representing a program is sent in scrambled form from a broadcasting station 11 to the subscribers 13 via a satellite 19. A special feature of the embodiment is to broadcast a control data which identifies each broadcasting station 11, multiplexed and added to the signal that represents the program.

In order to view/listen to the chargeable broadcasting, the subscriber inserts an IC card 23 purchased from the IC card store 17 into a meter rate charging decoder 21. By the insertion of the IC card 23, the decoder 21 starts descrambling the program signals for viewing/listening. On the IC card 23 is memorized at the time of purchase the data which represents the amount of the viewing/listening units permitted in accordance with the price of purchase. Every time the subscriber views/listens, the data of the completed viewing/listening is written byy the decoder 21 into the IC card 23 in accordance with the time of viewing/listening of the programs. The CPU in the IC card 23 computes the balance of the viewing/listening units by subtracting the number of completed viewing/listening units from the original viewing/listening units, and informs the result to the decoder 21. The decoder 21 judges the data to permit viewing/listening if the balance of the viewing/listening is more than 1 unit or forbid viewing/listening if the balance is zero. In this way, the subscriber can have an amount of viewing/listening which corresponds to the fees paid in advance, making the meter rate charging system operative. There may be cases in which the fees differ depending upon the programs, to which the present embodiment can respond in the following way. Namely, by including in the control data a digital code which indicates the view time permitted per one viewing/listening unit, each decoder controls the write interval of the data of the completed viewing/listening based on the digital code.

A further feature of the present embodiment is that at least the code of the station to which the program belongs is included in the completed viewing/listening data to be written to the IC card 23. In this way, an information on the programs that were viewed/listened to by the subscriber is written to the IC card 23. Therefore, statistics on the viewing/listening information can be obtained by collecting and reading the used IC cards 23 at the management center 15 as shown by FIG. 1. Another feature of the present invention is the fact that it is possible to determine the distribution of how much of the viewing/listening fees be allotted to each of the broadcasting enterprises 11 even for the case when there are a plurality of the broadcasting enterprises.

Figure 2:
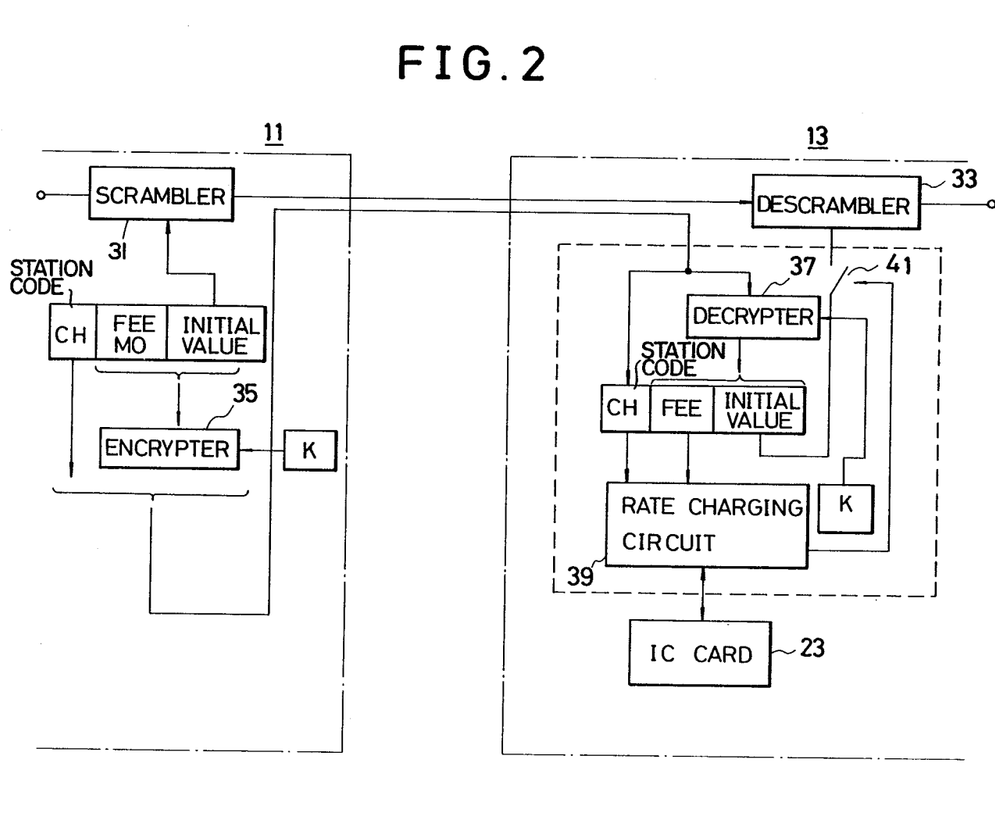
FIG. 2 is a block diagram illustrating the data flow between the broadcasting station and a subscriber shown in FIG. 1.

Now, a detailed explanation will be given about the signal flow in the broadcasting system by referring to FIG. 2. As shown in FIG. 2, a scrambler 31 and a descrambler 33 are provided on the sides of the broadcasting station 11 and the subscriber 13, respectively.

Supplied to the scrambler 31 is the ordinary broadcast signals. In the present embodiment, the signal supplied to the scrambler 31 is a digital signal, and the scrambling is accomplished by taking an exclusive-or operation between the digital signal and the binary random numbers.

The random numbers for this purpose are supplied by a random number generator which is not shown. The initial data for setting the initial values for the random number generator, that is, the first key at the scrambler 31 for the purpose of encryption is prepared by the broadcasting station 11 as a part of the control data referred to earlier. In the present embodiment, the initial data are frequently changed within a short period. The control data include, in addition, data for identifying the broadcasting station 11, data for representing the program category, data for representing the program number, and data for representing the fees, as mentioned earlier. The control data for the present embodiment are the data CH for identifying the station 11 and the data MO for representing the fees.

Of the above mentioned signals, MO which represents the fees and the initial data, are encrypted by means of a second key K at the encrypter 35. When the encrypted data is supplemented by the signal CH for identifying the station 11, it forms a control data which is sent to a transmitting apparatus (not shown). After multiplexing the control data and the output signal from the scrambler 31, the transmitting apparatus sends out the result to a broadcast satellite (not shown). In the case when the video/audio signal is digital, the time division multiplexing can be used as the multiplexing technique. In this case, it becomes necessary to employ a digital modulation technique such as QAM, PSK, or FSK.

In the meantime, on the subscriber side, the signals are received via the satellite, and are separated into the scrambled audio/video signal and the control data. The control data are further separated into the data CH for identifying the station and other data, namely, the data MO for the fees and the initial value data, as mentioned earlier. The latter of the above two data are supplied to a decrypter 37 to be decrypted by a second key K.

The second key K for this embodiment is housed in the memory of the IC card 23, and is read from the IC card on decryption. By arranging in this way, the broadcasting station 11 can reject, forged cards by changing the key K in such a case as when forged cards are in circulation. In such a case, it is necessary to change the second key after the sold cards are all collected. For the cases where no inconveniences arise by fixing the second keys of the encrypter and decrypter, the second keys K for both sides of the broadcasting station and the decoder may of course be housed in the ROM. For this embodiment, the second key K is assumed to be changed with a long period.

Of the decrypted data, the data MO representing the fees and the data CH identifying the station are supplied to the rate charging circuit 39.

The rate charging circuit 39 starts operation when the IC card 23 is inserted, as was mentioned earlier, and transmits to the IC card 23 the data on the completed viewing/listening and receives from the IC card 23 the information on the balance of the viewing/listening units. This will be described later in more detail. The rate charging circuit 39 judges permission or prohibition of viewing/listening based on the balance of the viewing/listening units.

The signal for permission and prohibition of viewing/listening is a 1-bit digit signal. Such a signal is supplied to the switch 41. The switch 41 closes when a permission signal for viewing/listening is supplied, and opens when a prohibition signal for viewing/listening is supplied. To one terminal of switch 41 is supplied the decrypted initial value data, while the other terminal is connected to the supply terminal of the initial value data of the descrambler 33. The descrambler 33 of the present embodiment may be made to have the same construction as the scrambler 31.

On the other hand, the rate charging circuit 39 writes the signal CH for identifying the station and the program code, as a pair, into the IC card 23.

Such an IC card 23 is returned to the IC card store 17 when the amount of the completed viewing/listening units becomes equal to amount of the viewing/listening units which has been memorized in advance. The IC card store 17 forwards the used IC cards to the management center 15. At the management center 15, the content of the IC cards 23 is read and statistics are taken on the viewing/listening information for each of the broadcasting station 11. The management center 15 allots the fees to each of the broadcasting station 11 based on these statistics. To facilitate the collection of the IC card 23 an arrangement may be made to set the price of the IC card at somewhat above the fees for viewing/listening, and refund the balance at the time of return of the IC card 23 to the store 17. Also, it may be arranged to assign a term of validity to the IC card 23.

Figure 3:
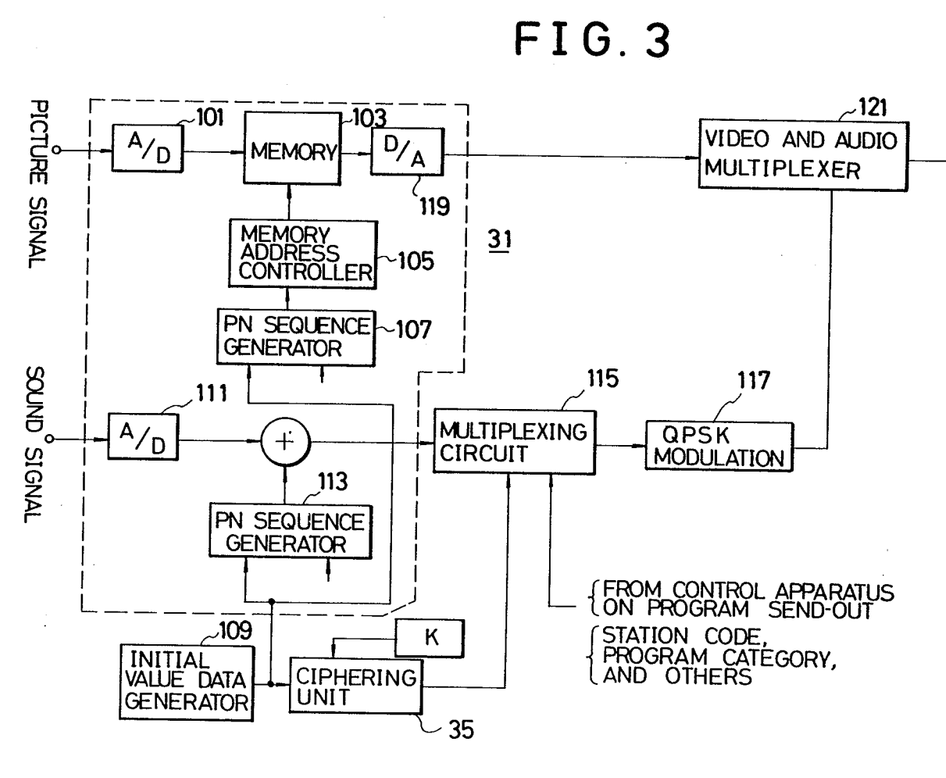
FIG. 3 is a block diagram illustrating the details of the broadcasting station shown in FIG. 2.

Next, a detailed description will be given about the broadcasting station 11, in particular about the scrambler 31. A broadcasting station 11 in accordance with the present invention is constructed as shown by FIG. 3. Namely, the video signal and the audio signal are obtained by the ordinary broadcasting equipment. In the description that follows, both are assumed to be analog. These signals are supplied to the scrambler 31. At the scrambler 31, the video signal is scrambled by a line rotation, while the audio signal is scrambled by means of an exclusive-or with digital random numbers.

Figure 4:
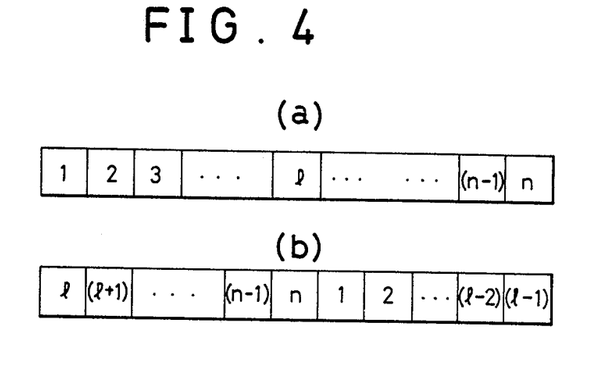

Namely, the video signal is supplied to a memory 103 via an A/D converter 101. The line rotation mentioned above is accomplished by controlling the order of read and write of the video signal for the memory 103. What executes the control is a memory address controller 105. Suppose, for example, the order of the picture elements in one original scanning line was as shown by FIG. 4a. For such an order, the line rotation circuit consisting of the memory 103 and the memory address controller 105 carries out an operation which changes the order of the picture elements to the one as shown by FIG. 4b. Here, FIG. 4b is a circularly shift of FIG. 4a to the left for an amount corresponding to 1−1 elements. When a video signal, which is scrambled such in a line rotation, is received by an ordinary receiver, no normal picture will be reproduced. This constitutes the principle of scrambling by line a rotation system.

Figure 5:
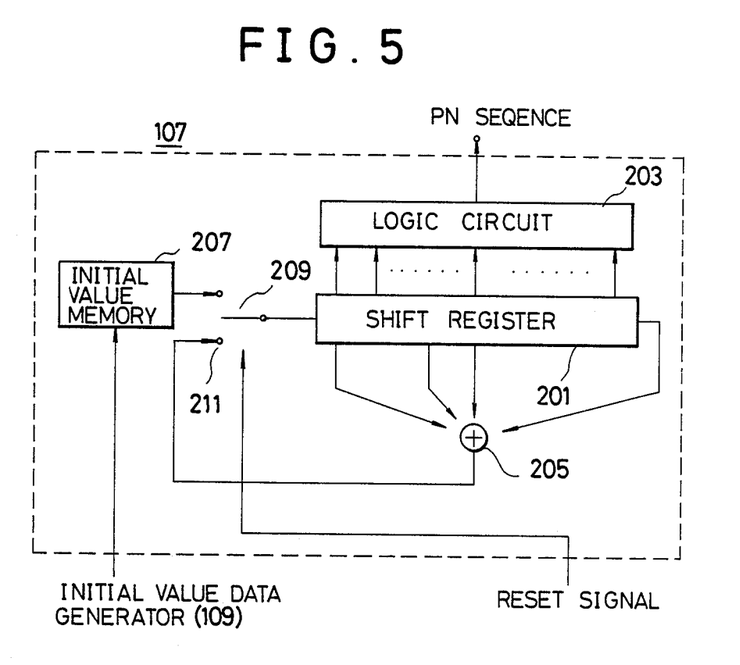
FIG. 5 is a block diagram illustrating the details of the PN sequence shown in FIG. 3.

It should be noted that the starting point is determined by the output of a PN sequence generator 107 in order to increase the security of the scrambling operation. The PN sequence generator 107 is a matter of common knowledge, and may be constructed, for example, as shown by FIG. 5. The generator 107 includes a shift register 201, a logic circuit 203, a binary adder, and an initial value memory 207.

In the initial value memory 207, there is memorized an initial value data which is generated by an initial value data generator 109.

The initial value data is arranged to have an equal number of bits as in the shift register 201. Next, a switch 209 is closed to the side of the initial value memory 207, and the memory 207 and the shift register 201 are connected.

In this way, the data in the initial value memory 207 is set in the shift register 201. Then, the switch 209 is closed to the side of a terminal 211. The terminal 211 is connected to the output terminal of the binary adder circuit 205. The inputs to the binary adder circuit 205 are the bits of the shift register 201. The choice of the bits is determined appropriately depending upon the design. By shifting the content of the shift register 201 one step at a time and at the same time, by taking out the memory content of the prescribed bits, the prescribed logic operation is carried out at the logic circuit 203.

The output of the logic circuit 203 becomes the PN sequence. To change the PN sequence, it sufficies to close the switch 209 to the side of the initial value memory 207, which is triggered by a reset signal. In this case, the initial value memory 207 may memorize a data which is different from the initial value data at the earlier time.

Further, for scrambling the video signal, it is possible to apply not only line rotation system explained above, but also the line permutation system in which a plurality of scanning lines of the picture are interchanged according to a predetermined order.

On the other hand, the audio signal is exclusive-ored with the output of a PN sequence generator 113, after being A/D converted by an A/D converter 111. The PN sequence generator 113 has the same construction as the PN sequence generator 107. The scrambled data obtained got by the exclusive-or operation with PN sequence is supplied to a multiplexing circuit 115. The multiplexing circuit 115 adds the control data to the scrambled data in order to form a predetermined data frame. Here, the control data include an initial value data, the data MO which represents the fees, and the additional data that are necessary for changing. The additional data include the data CH supplied by the program send-out control apparatus (not shown) for representing the station, the data which represents the program category, the signal which indicates that the program may be viewed/listened free of charge, and so forth.

After these data are added and common-knowledge processings such as interleaving are applied, it is QPSK modulated at a modulator 117. Since there are now available two modes A and B for A/D conversion of the audio signal, in the case of utilizing these modes selectively, it becomes necessary to transmit the data on the mode choice to the A/D converter 111.

Figure 6:
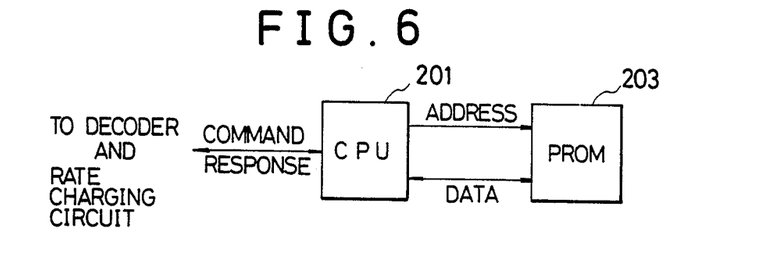
FIG. 6 is a system block diagram of the IC card.

The scrambled video signal and the scrambled audio signal are synthesized by a video and audio synthesizer 121. For example, the scrambled audio is frequency multiplexed by the PCM subcarrier system to the scrambled video signal. A signal obtained in this manner is transmitted to the satellite. Next, a description will be given about the IC card 23. The IC card 23 for the present embodiment includes a CPU 201 and a PROM (programmable read only memory) 203 as shown by FIG. 6. The CPU 201 receives a command from the rate charging circuit 39 in the decoder 21, and returns a response to the rate charging circuit 39.

The IC card 23 used here possesses 8 terminals on the surface of the card. These terminals include a data line, a clock line, a power supply terminal a GND terminal, a power supply terminal for PROM writing, a reset terminal, and others. The synchronization is accomplished by the start-stop synchronization system.

Figure 7:
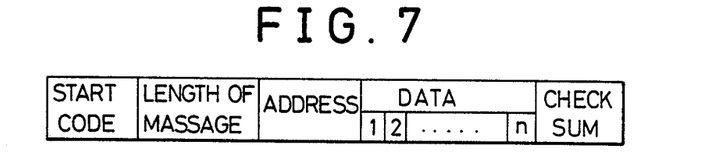
FIGS. 7 and 8 are diagrams illustrating the formats of the command and response.

First, when the IC card 23 is inserted in the decoder 21, the CPU 201 will be in a state of waiting for a command. When a command is given to the IC card 23 from the decoder 201, the CPU 201 executes a processing according to the command. The command from the decoder 201 is given a format, for example, as shown by FIG. 7.

The command is for writing the data on the completed viewing/listening into IC cards. The data on the completed viewing/listening which include the station code is written in the PROM 203. When the charge bit in the control data indicates free of change, the writing of the data will not take place. At the time of insertion of the IC card 23 and at the time of setting the channel, the writing of the data on the completed viewing/listening will be waited for a predetermined period, since it is possible to have a change in the selection of the station or a cancellation of viewing/listening. The interval at which the writing of the data on the completed viewing/listening takes place varies with the data for indicating the fees, as mentioned earlier. The CPU 201 computes the total number of the data which have already been written. Then, this total is subtracted from the amount of the viewing/listening units (this being a data which has been memorized in the IC card 23 as the initial value data, indicates the amount that the subscriber can view/listen to the programs in accordance with the fees paid).

Figure 8:
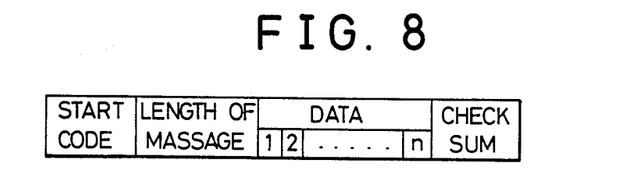

The CPU 201 puts the result in a format as shown by FIG. 8, and forwards it to the decoder 21 as a response.

Now, in a prior art IC card (for example, CP-8 by Honeywell-Bell Co.), the validity of the IC card is checked prior to the initiation of communication between the IC card and the terminal. However, once its validity was established, no further check was carried out thereafter. Therefore, the system is vulnerable to a data spoof which is done after the validity check.

In the present embodiment, such a defect can be eliminated in the following manner. Namely, the validity of the card is always checked throughout the communication rather than prior to the initiation of the communication.

Figure 9:
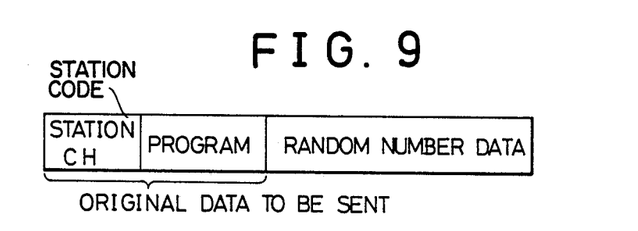
FIG. 9 is a diagram illustrating the details of the data in the format shown in FIG. 7.
Figure 12:
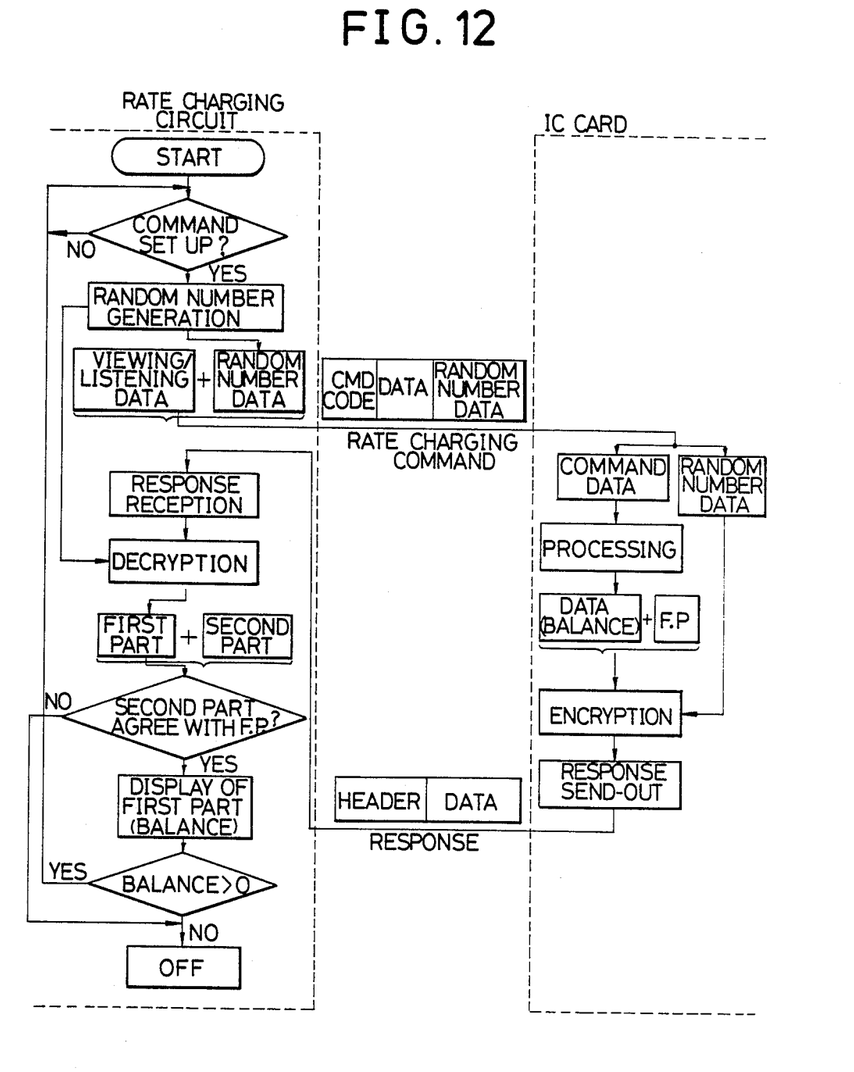
FIG. 12 is a block diagram illustrating the data flow between the rate charging circuit and the IC card embodying the present invention as shown in FIG. 2.

In order to accomplish this, random numbers are generated first in the decoder 21, as shown by FIG. 12. The random number data is sent to the IC card 23 following the data to be transmitted. For example, the random number data is added following the data on the completed viewing/listening which is composed of the data CH that identifies the station, as shown by FIG. 9.

At the IC card 23, after receipt of the command, the ramdom number data is separated to be memorized temporarily in the RAM, and the data on the completed viewing/listening is written into the PROM.

Next, the balace sum is computed as mentioned earlier. When the data representing the balance is obtained, a fixed pattern is added to the data. The fixed pattern is a digital pattern which is memorized in advance in the IC card 23.

The data thus obtained is then encrypted. Here, the key to be used for encrypting the data is the random number data referred to in the foregoing.

The response has a construction in which a header is added at the head of the encrypted data. When the decoder 21 receives such a response, the decoder 21 decryptes the data portion. The key used for decryption is the random number data which was generated originally in the decoder 21.

The data thus decrypted is separated into the data to be truly transmitted and the fixed pattern. The bit pattern is the fixed pattern portion is checked whether it is identical to the fixed pattern memorized in the IC card 23. Of course the fixed pattern is held and sealed in common in the decoder 21 and the IC card 23.

By means of such a check, any spoofing that might have been committed between the decoder 21 and the IC card 23 will be detected without failure. However, this is only valid on the condition that the security is maintained for the decoder 21. Therefore, the principal part of the decoder 21 must be integrated on a large scale so as to make it infeasible to forge, and in addition, the design of the decoder 21 should be maintained undisclosed.

If the rate charging command from the decoder 21 is destroyed here, there will appear no response that should be returned from the IC card to the decoder so that the decoder can detect an abnormality.

In addition, if the output data from the IC card 23 is tampered with, the correct fixed pattern will not be received in the decoder 21, making it possible to detect the falsification.

These checks will be applied incessantly throughout the communication so that a forgery on the data will become utterly impossible.

On the other hand, if a pattern which is identical to the fixed pattern in the decoder 21 is detected as a result of a check on the fixed pattern, the response data is judged to be a correct one that respresents the balance. This data is displayed on the outside as the remaining viewing/listening units, and may be imparted to the viewer/listener. However, when the balance is zero, viewing/listening of the programs is prohibited, as was mentioned earlier.

Figure 13:
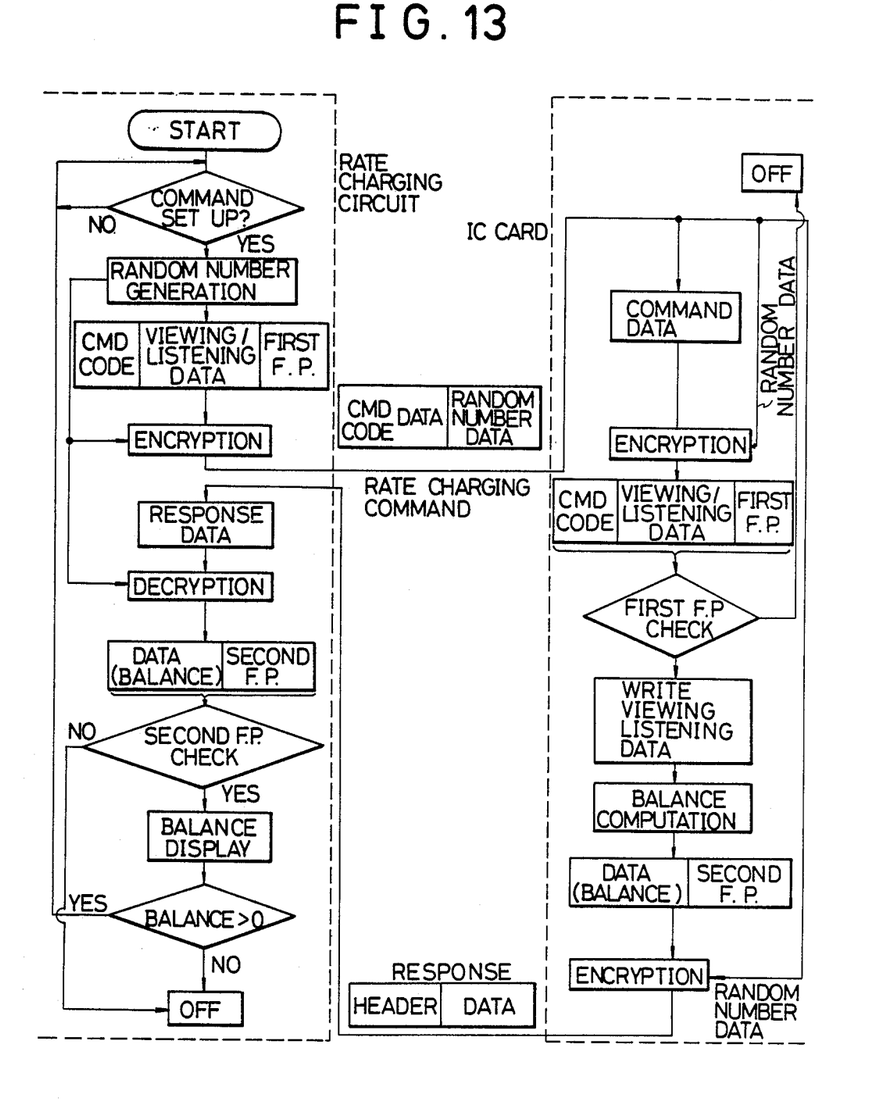
FIG. 13 is a block diagram which illustrates a modification to the data flow between the rate charging circuit and the IC card that are embodying the present invention as shown in FIG. 2.

Next, the operation of a modification to the rate charging circuit and the IC card embodying the present invention will be described by referring to FIG. 13. In this embodiment, encryption is also applied to the command from the rate charging circuit 39 to the IC card.

First, a first fixed pattern (1st F.P.) is added to the rate charging command which consists of a command code and a viewing/listening data. The total code is then encrypted. The algorithm for the encryption is designated by the random numbers obtained by the random number generator. The simplest algorithm for the encryption is the permutation of the bit data.

Next, by adding the random number data mentioned earlier, it is sent to the IC card 23 in a prescribed format.

At the IC card 23, the command data and the random number data are separated out. Next, the command data is decrypted. The algorithm to be used for the decryption is that which is designated by the random number data. The algorithm to be used for this purpose is the one which is in the inverse functional relation to the algorithm that was used in the encryption of the rate charging circuit 21.

The decrypted data comprises a command code, a viewing/listening data and the first fixed pattern, 1st F.P. The first fixed pattern obtained here is judged whether it coincides with the added pattern that was generated at the rate charging circuit 21. The first fixed pattern is assumed to be memorized in advance in the rate charging circuit 21 and in a proper IC card 23. If an agreement is not obtained, it is regarded that the rate charging command has been tampered with between the rate charing circuit 21 and the IC card 23, and the abnormality is informed to the rate charging circuit 21.

On the other hand, if the patterns agree, the prescribed processings will be executed. Namely, the viewing/listening data is written in the PROM of the IC card 23, and the balance is computed. The balance which is the data thus obtained is sent to the rate charging circuit 21. At this time, it is encrypted after a second fixed pattern, 2nd F.P., is added. The algorithm for the encryption is assumd to be designated by the random number mentioned above. After the data thus encrypted is formed into a prescribed format, it is sent to the rate charing circuit 21 as a response.

At the rate charging circuit 21, the data portion is separated from the response and is decrypted. The algorithm for this decryption is designated by the random number data which was generated at the rate charging circuit 21. Here, it is assumed to be the algorithm which is in the inverse functional relation to the algorithm that was used for encrypting at the IC card 23.

The data thus decrypted consist of the data which represents the balance and the second fixed pattern, 2nd F.P. Of these, the signal pattern at the prescribed position in the decrypted data is judged whether it agrees with the second fixed pattern, 2nd F.P. (the 2nd F.P. is assumed to be memorized in the rate charging circuit 21 and the proper IC cards 23).

If an agreement was not obtgained, it is judged that the response was tampered with, and the operation is interrupted. For example, it either prohibits viewing/-listening or rejects the IC card 23 that is inserted in the rate charging circuit 21. When an agreement is confirmed, the balance is displayed by judging that it represents the correct value. Next, whether the balance is greater than zero is judged. If it is zero, viewing/listening is prohibited. On the other hand, if it is greater than zero, it permits to continue viewing/listening.

Figure 14:
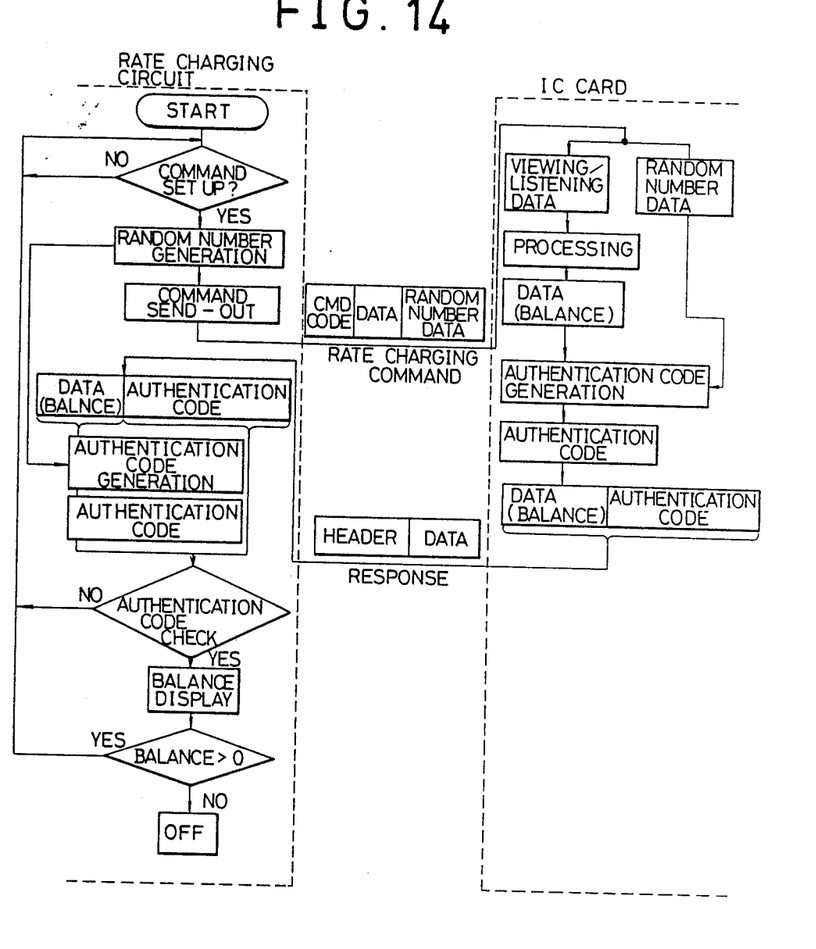
FIG. 14 is a block diagram which illustrates another modification to the data flow between the rate charging circuit and the IC card that are embodying the present invention as shown in FIG. 2.

Next, another modification to the validity check between the rate charging circuit 21 and the IC card 23 will be described by referring to FIG. 14.

The rate charging circuit 21 sends a rate charging command consisting of the CMD code, a data (viewing/listening data), and a random number data to the IC card 23. Of these commands, the IC card 23 separates the viewing/listening data and the random number data. Then, a processing in accordance with the CMD code is applied to the viewing/listening data. Namely, a writing of the viewing/listening data and a computation of the balance are executed. Then, an authentication code for the balance data is generated according to a prescribed algorithm. The generation of an authentication code will be described later. The balance data and the authentication code is sent to the rate charging circuit 21 as a response, formed in the prescribed format.

At the rate charging circuit 21, the data on the balance is separated from the authentication code. A reference authentication code generated in the rate charging circuit according to the identical algorithm as was used in the IC card 23. Then, a comparison is made between these authentication codes.

If there is obtained no agreement between them, then it is judged that the data in the response was tampered with, and the operation is interrupted. On the other hand, if an agreement is obtained, the data in the response is regarded as proper, and the operation is continued; the balance is displayed, and a check is made whether the balance is greater than zero. When the balance is greater than zero, viewing/listening is allowed, whereas viewing/listening is prohibited when it is zero.

It is of course possible to add an authentication code also to the rate charging command in the above embodiment.

Figure 15:
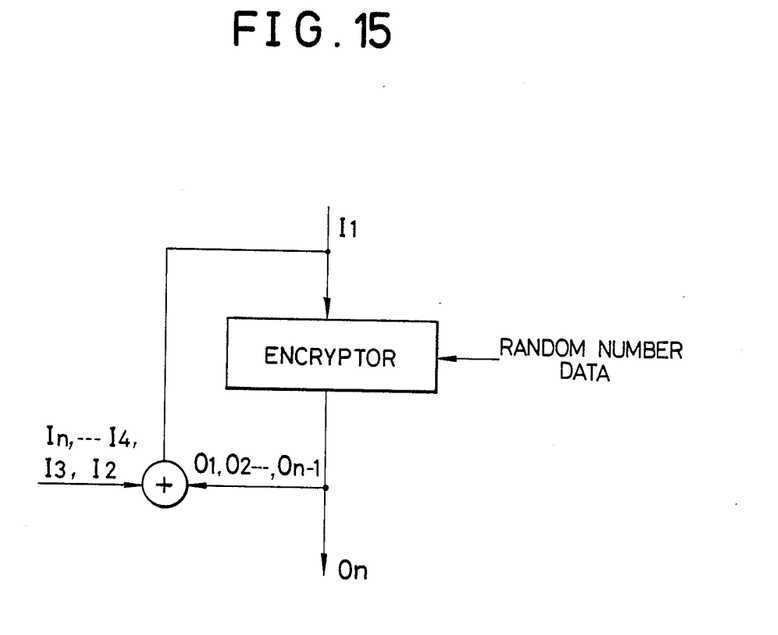
FIG. 15 is a block diagram illustrating the details of the authentication code generation unit in FIG. 14.

Next, the generation of an authentication code will be described in reference to FIG. 15. In the procedure for generation, the data is first divided into several blocks $I_1$ through $I_n$. Each of these blocks consists of a prescribed number of bits. Then, the first block $I_1$ is encrypted. This encryption is assumed to be designated by a random number data. The output of such an encrypting means is called $O_1$.

An exclusive-or between the output $O_1$ and the second block $I_2$ is taken. Then, the result of this operation is encrypted by the identical encrypting means as for the preceding operation.

The random number data itself that specifies the encryption may be fixed or varied in the respective operation for each block $I_i$. An exclusive-or is taken further between the output $O_2$ of this encryption and the block $I_3$. By repeating similar operations further there is obtained an output $O_n$ from the encrypting means. The most significant m bits of the output $O_n$ will be used as the authentication code.

Next, the above operations will be clarified by means of the mathematical expressions. Namely, they are given by $$E\ (I_1) \to O_1$$
$$E\ (O_1 \oplus I_2) \to O_2$$
$$E\ (O_2 \oplus I_3) \to O_3$$
$$\vdots$$
$$E\ (O_{n-1} \oplus I_n) \to O_n.$$

This algorithm for generating an authentication code is installed in both of the rate charging circuit 21 and the IC card 23. This is in contrast to the situation in the preceding embodiments in which mutually inverse algorithms were installed, such as an encryption for one and a decryption for the other.

Next, another embodiment of the present invention in which two kinds of subscribers coexist will be described. This embodiment relates to a system in which there coexist flat fee subscribers and the meter rate subscribers. For a large quantity consumer like a system operator of a CATV network, the fee management by means of the IC card may be inconvenient. Therefore, flat free contract (for example, a contract by the month) is brought. Needless to say, in flat fee case a prescribed fee will be paid irrespective of the amount of viewing/-listening of the programs.

Figure 10:
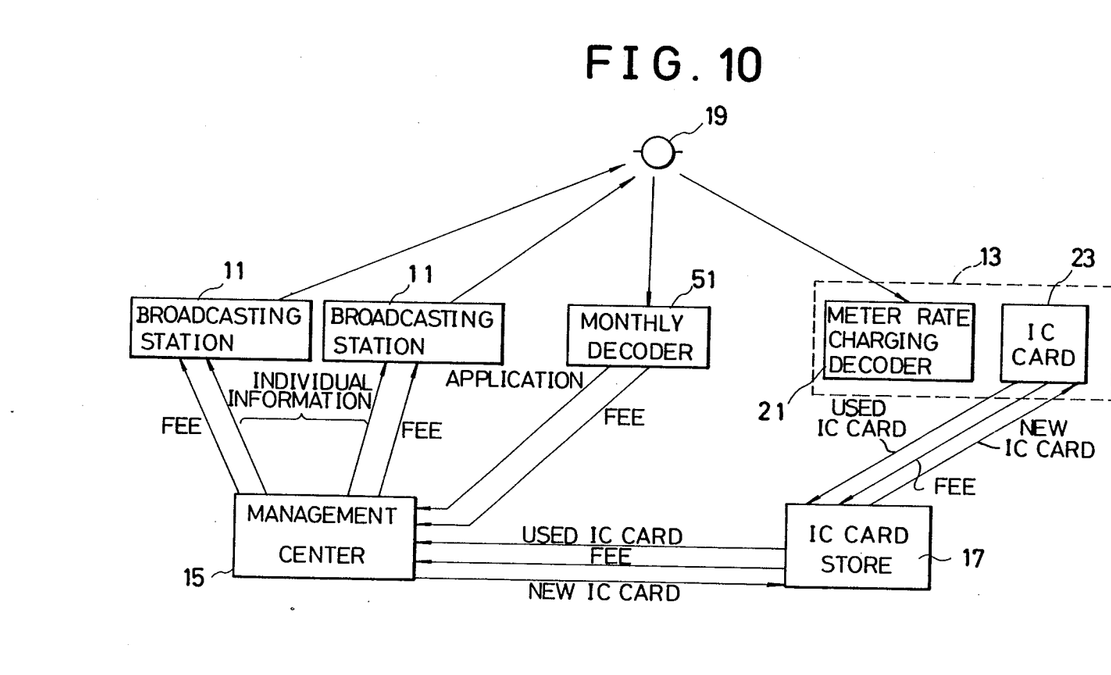
FIG. 10 is a block diagram illustrating another embodiment of the invention.

The system diagram of this embodiment is described in FIG. 10. In this system monthly decoders are added to the system shown in FIG. 1. With the introduction of these decoders, there becomes necessary another kind of control data in the radio waves besides the one described in the first embodiment. In order to distinguish the two kinds of control data, the control data that is used also in the first embodiment will be called "common data", and the newly added control data will be called "individual information". The reason for this naming is that "common information" is sent to all of the subscribers in common, and "individual information" is sent to each monthly decoder 5 individually.

Figure 11:
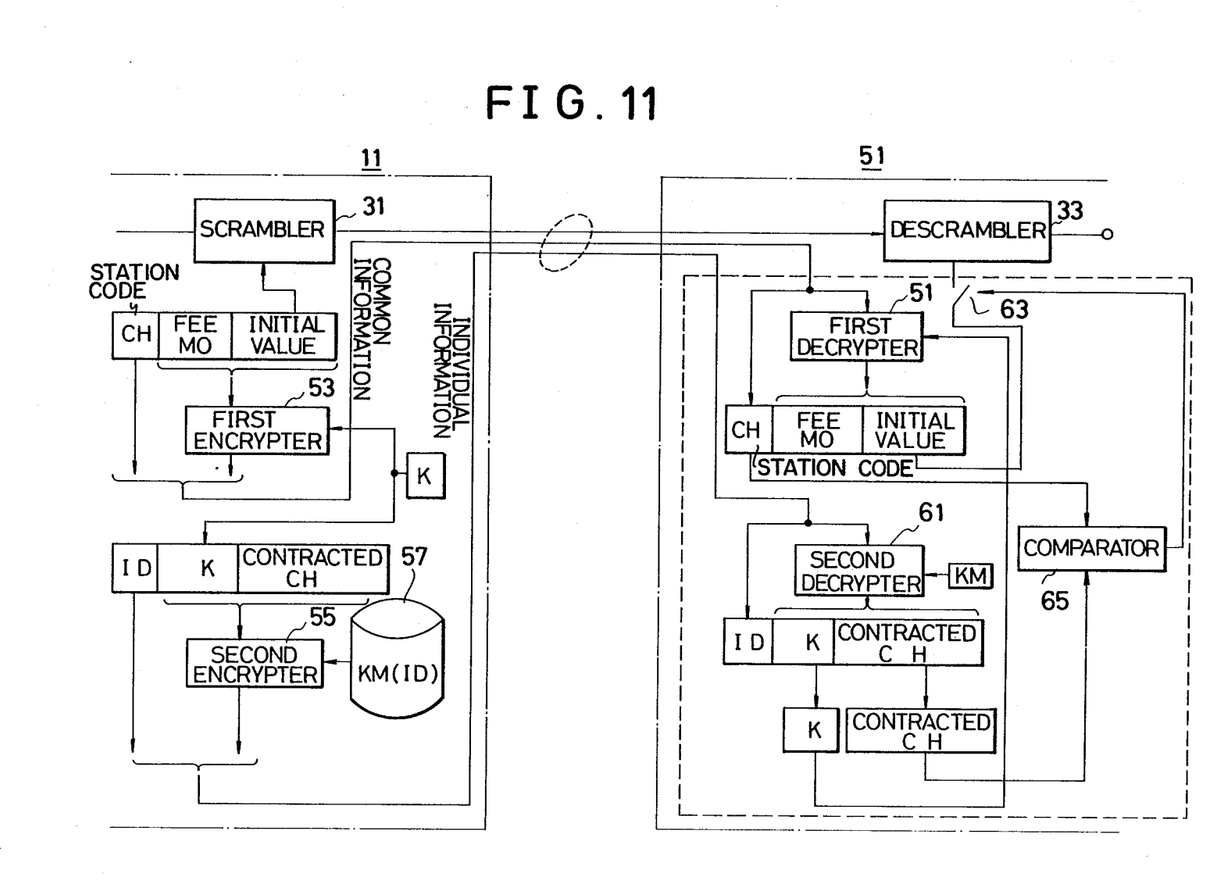
FIG. 11 is a block diagram illustrating the data flow between the broadcasting station and a monthly decoder in the system shown in FIG. 10.

Now, the transmission of the information between the broadcasting station 11 and a monthly decoder 51 will be described. FIG. 11 illustrates the processing procedure that is needed between the broadcasting station 11 and a monthly decoder 51.

As for the common information (namely, the data CH for identifying the station, the data MO for representing the fees, signal for initial value setting, and so forth), the same processing as in the previous embodiments will be executed. Of these, the first encrypter 53 corresponds to the encrypter 31 of FIG. 2. On the other hand, the individual information includes the data for representing the key K used for the first encrypter 53, the contracted channel data for representing the channel contracted by the subscriber to monthly decoder 51, and the ID data allotted to each of the monthly decoders 51.

The data on the key and the contracted channel data in the individual information are encrypted by the second encrypter 55. the key KM(ID) of the second encryptor is different for respective monthly decoder 51. The key KM (ID) is stored in the ROM of each monthly decoder 51. This will be described later.

The individual information and the common information are transmitted together with the output of the scrambler 31. The individual information is required to be sent individually for each monthly decoder 51. Since, the contract for a monthly decoder 51 is renewed by the month, the individual information must be sent once a month to each monthly decoder 51.

Upon receipt of such an information, each monthly decoder 51 operates as follows. First, the individual information is separated out from the signal received, and the ID in the individual information is compared with the ID which was memorized in advance in the decoder 51. The following operation will be executed only when there is obtained an agreement between them, while no further operation will be carried out when no agreement is obtained.

Both of the data on the key and the contracted channel are decrypted by a second decrypter 61. The key KM for this purpose was memorized in the memory at the stage of its production and was sealed in the monthly decoder 51. The data on the key and the contracted channel thus decrypted at the second decrypter 61 are memorized together in an RAM (random access memory). It is necessary to have these data held there since they are sent for only once a month in principle. The RAM is arranged to be a double buffer for the current month and for the next month.

The data on the key is supplied to a first decrypter 59. Supplied to the first decrypter 59 are the signals other than that for the data CH of the common information. The information in these signals had been encrypted on the side of the broadcasting station 11. These encrypted data are decrypted by the first decrypter 59. The initial value data is supplied via a switch 63 to the input terminal for the initial value in a descrambler 33. The signal MO which represents the fees is an information that is unnecessary for the monthly decoder 51 of this embodiment.

On the other hand, the data representing the contracted channel is read from the RAM and is supplied to a comparator 65. The data CH in the common information is supplied to the comparator 65, and a signal for permitting viewing/listening is output when an agreement is obtained, while a signal for prohibiting viewing/listening is output when an agreement is not obtained. These signals are supplied to the switch 63, and the switch 63 is closed when there is a signal permitting viewing/listening, and the switch 63 is open when there is a signal prohibiting viewing/listening.

In this way, in a monthly decoder 51, only the subscriber who possesses the key KM can obtain the correct data on the key and the data that represent the contracted channels. In addition, only the programs broadcasted in the contracted channel can be received correctly.

In a system as shown in FIG. 10, the meter rate charging decoder 21 is the same as that in the first embodiment. Unless the frame construction is changed, the same operation can be accomplished.

A subscriber having a monthly decoder 51 in this embodiment pays the fees to the management center 15 at the time of purchase of the decoder 51 or at the time of applying for a new contract. The management center 15 inputs individual information for each contract to memory media, and sends the memory media to each broadcasting station 11. At the same time, the charges are distributed among the broadcasting stations 11 based on the terms of the contract. Although in this embodiment the contract is assumed to be of the type by the month, various other forms such as a contract by the station or a contract by the kind of program is also possible.

In the foregoing, a description has been given in connection with the embodiments of the present invention, but the present invention is not at all limited to these embodiments. For example, the broadcast signal need not be in the form of a combination of the video signal and the audio signal, as in the case of television broadcast, and may be a broadcast of the audio signal alone. In addition, generally speaking, a broadcasting may be defined as a specific information service for the subscribers from a center.

The IC card as a means of memorizing the data may be replaced by a device like a ROM pack. Furthermore, for the convenience of operation of the system, it is desirable to have numerous IC card stores in various areas throughout the country, and the management centers suffice to be established in the regions in which key broadcasting stations are concentrating. Also, regarding the transmission of the signal, it need not necessarily be done via a satellite, and may, in an extreme instance, employ the wired broadcasting, in order to apply the present invention.

Furthermore, it should be mentioned that the present invention will not be affected adversely even if the control data which include the data on the station and others are not broadcast all the time. Also, as to the fees for the programs, the present embodiments are arranged to control the interval at which the data is written in accordance with the program, by setting that one unit of the data represents the same sum of money. However, the data may be changed so as to be arranged to have different data written in accordance with the fees charged. Further, although the IC cards in the embodiments are arranged to be returned to the store, it may be arranged to have only the memorized data collected at the store.

It should be noted that a further consideration may be required in connection with the security of the system.

In summary, according to the present invention, the received amount of the broadcast signals can be managed accurately for respective receiver so that it can provide a chargeable broadcasting system which is free from unfair feeling and is very favorable. In addition, according to the present invention, the security of the data processing system with the IC card can be improved conspicuously, since a check on the validity of the response is carried out whenever there comes in a command, eliminating the possibility of tampering with the data.

Various modifications will become possible for those skilled in the art after receiving the teachings of the present disclosure without departing from the scope thereof.

What is claimed is:

1. A broadcasting system for subscriber's selectively receiving any one of a plurality of programs received by a subscriber receiver, which comprises:
   (a) a plurality of stations for broadcasting programs signals including a station code for identifying each station and a fee code;
   (b) a plurality of subscriber receivers provided with a meter rate charging decoder and storage means, the station code being stored in said storage means through said meter rate charging decoder whenever programs are selected by said receiver; and
   (c) a management center for determining a fee to be paid from the subscriber to each of the stations on the basis of the program signals including said station code and the fee code;
   wherein said storage means is an IC card including a CPU and a memory unit, said IC card storing data indicative of an initial amount of receivable programs corresponding to a pre-paid fee;
   wherein said meter rate charging decoder writes a data related to a viewed/listed program together with the station code in said memory unit of said IC card, and receives balance data indicative of the amount of remaining receivable programs from said IC card; and
   wherein said meter rate charging decoder generates and sends a key for encrypting the balance data of the receivable amount to the IC card whenever a charge command is transmitted, the IC card encrypts the receivable amount by the key, and the meter rate charging decoder decrypts the receivable amount by the key.

2. The broadcasting system as set forth in claim 1, wherein the management center collects the used IC cards to obtain statistical data as to viewed/listened program information, and determines allotments and distributions of viewed/listened program fees for each broadcasting station by reading and counting the station codes stored in said IC card.

3. The broadcasting system as set forth in claim 1, wherein said CPU computes remaining receivable program amount by subtracting consumed receivable program data obtained by counting the number of the station data from the initial receivable program amount.

4. The broadcasting system as set forth in claim 3, wherein reception of a program is enabled or disabled by said meter rate charging decoder in response to the balance computed by said IC card.

5. The broadcasting system as set forth in claim 3, wherein a time interval for writing the station code in the storage means is controlled according to fee codes transmitted from the station and included in the program signals.

6. The broadcasting system as set forth in claim 1, wherein said IC card is purchased by the subscriber at a predetermined price.

7. The broadcasting system as set forth in claim 1, wherein the subscriber receiver is activated when said IC card is inserted into the subscriber receiver.

8. The broadcast system as set forth in claim 1, wherein said meter rate charging decoder carries out a validity check on the balance data of the receivable amount which is sent from the IC card.

9. A method of viewing/listening to programs sent in scrambled form from a plurality of satellite broadcasting stations on the basis of a prepaid card and a control signal identifying each broadcasting station, which comprises the steps of:
   (a) inserting the IC card into a meter rate charging decoder to descramble program signals for viewing/listening;
   (b) writing data representative of completed viewing/listening by means of a decoder into the IC card;
   (c) computing a balanced of viewing/listening units by substracting the number of completed viewing/listening units from an original number of viewing/listening units and feeding the subtracted result to the decoder as balance data;
   (d) judging the balance data, to permit viewing/listening if the balance data of the viewing/listening is more than 1 unit, and forbidding viewing/listening if the balance data is zero so as to correspond to fees paid in advance;
   (e) collecting and reading the IC cards at a management center to determine viewing/listening fees to be allotted to each of the broadcasting stations and wherein step (b) includes performing a validity check including the steps of:
       (1) generating random numbers in the decoder and sending the random numbers to the IC card following the data to be transmitted;
       (2) separating the random number in response to a command and storing the random number temporarily;
       (3) adding a fixed digital pattern stored in advance in the IC card after the balance data is obtained;
       (4) encrypting the balance data with the random numbers as a key;
       (5) adding a header at the head of the encrypted data;
       (6) decrypting the data by the decoder with the random number as the key;
       (7) separating the decrypted data into the data to be transmitted and a fixed pattern; and
       (8) checking whether the separated fixed pattern is identical to that stored in the IC card.

10. The method of claim 9, wherein in step (d), if a fee to be paid differs according to different programs, the method further comprises the following steps of:
    (a) sending a code indicating view times permitted per one viewed/listening unit together with a control signal form the broadcasting station; and
    (b) controlling by the decoder write intervals of the data of the completed viewing/listening based on the sent code.

* * * * *